(12) United States Patent
Tanimoto

(10) Patent No.: US 7,116,435 B2
(45) Date of Patent: Oct. 3, 2006

(54) FACSIMILE DEVICE

(75) Inventor: Yoshifumi Tanimoto, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 865 days.

(21) Appl. No.: 10/005,451

(22) Filed: Nov. 2, 2001

(65) Prior Publication Data

US 2002/0054371 A1 May 9, 2002

(30) Foreign Application Priority Data

Nov. 7, 2000 (JP) ............................. 2000-339678
Nov. 17, 2000 (JP) ............................. 2000-351835
Jul. 19, 2001 (JP) ............................. 2001-220568
Jul. 19, 2001 (JP) ............................. 2001-220569

(51) Int. Cl.
*H04N 1/00* (2006.01)
*H04N 1/32* (2006.01)

(52) U.S. Cl. ..................... 358/1.15; 358/440; 358/442; 358/434

(58) Field of Classification Search ............... 358/1.15, 358/440, 442, 434; 370/253; 379/100.17
See application file for complete search history.

(56) References Cited

U.S. PATENT DOCUMENTS

| 6,259,538 | B1 * | 7/2001 | Amit et al. ................... 358/442 |
| 6,404,746 | B1 * | 6/2002 | Cave et al. .................. 370/262 |
| 6,539,015 | B1 * | 3/2003 | Voit ............................ 370/389 |
| 6,542,472 | B1 * | 4/2003 | Onuma ........................ 370/253 |
| 6,563,599 | B1 * | 5/2003 | Whitfield .................... 358/1.15 |
| 6,661,785 | B1 * | 12/2003 | Zhang et al. ................ 370/352 |
| 6,665,293 | B1 * | 12/2003 | Thornton et al. ........... 370/352 |
| 6,819,750 | B1 * | 11/2004 | Mehta et al. ........... 379/100.17 |
| 6,822,755 | B1 * | 11/2004 | Kurtz ......................... 358/1.15 |
| 2004/0100648 | A1 * | 5/2004 | Kulakowski ............... 358/1.13 |

FOREIGN PATENT DOCUMENTS

JP 2000-196802 7/2000

\* cited by examiner

*Primary Examiner*—Kimberly Williams
*Assistant Examiner*—Charlotte M. Baker
(74) *Attorney, Agent, or Firm*—Hogan & Hartson LLP

(57) ABSTRACT

A facsimile device for transmitting image data, using a computer communication network such as the Internet. A transmitting side facsimile device FAX1*a* determines whether the Internet NTW or the public switched telephone network PSTN is used, by confirming whether information showing to use NTW is attached to the facsimile number of the destination facsimile device FAX2. If NTW is used, image data is transmitted to the gateway device GTW1 and the facsimile number of FAX2. Users can easily select a requested communication network. FAX1*a* discriminates the beginning number attached in the beginning of the destination number input by users and confirms whether the internal network K, PSTN or NTW is used in sending image data. If NTW is used, the IP address of the nearest gateway device GTW in FAX2 is acquired and image data and the destination number is transmitted by designating the IP address as a destination.

20 Claims, 10 Drawing Sheets

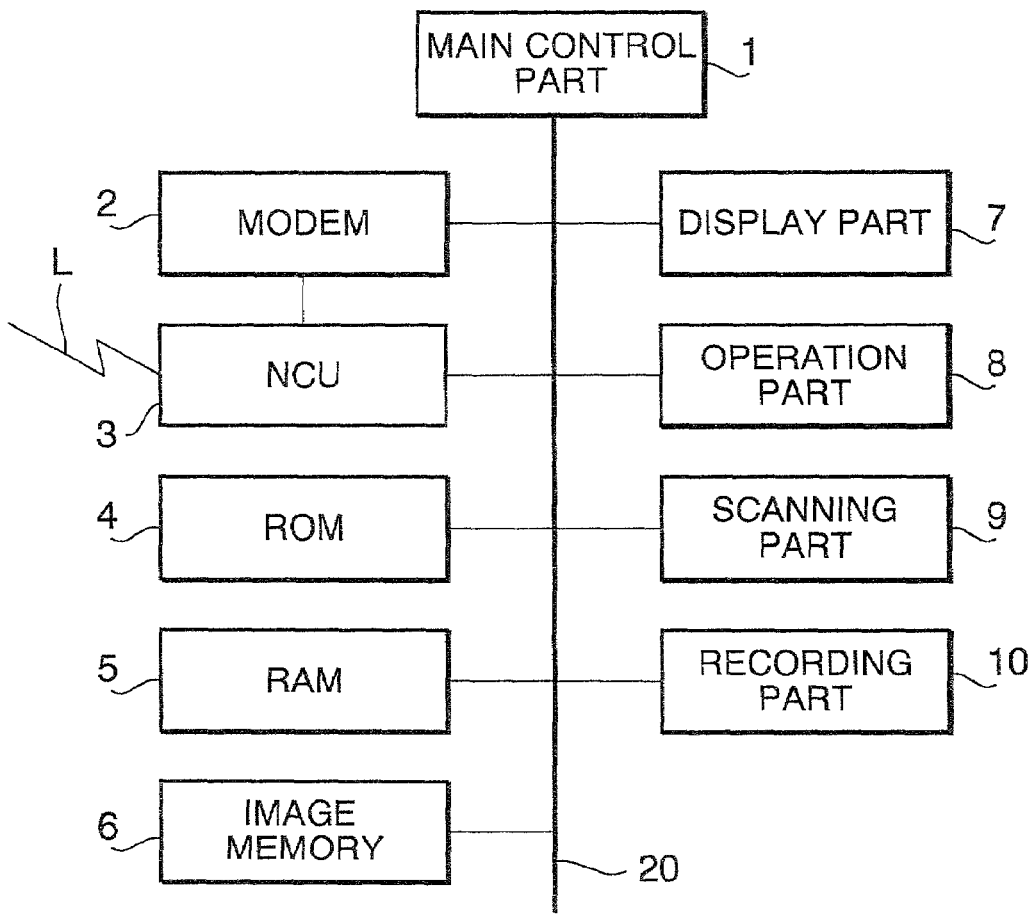

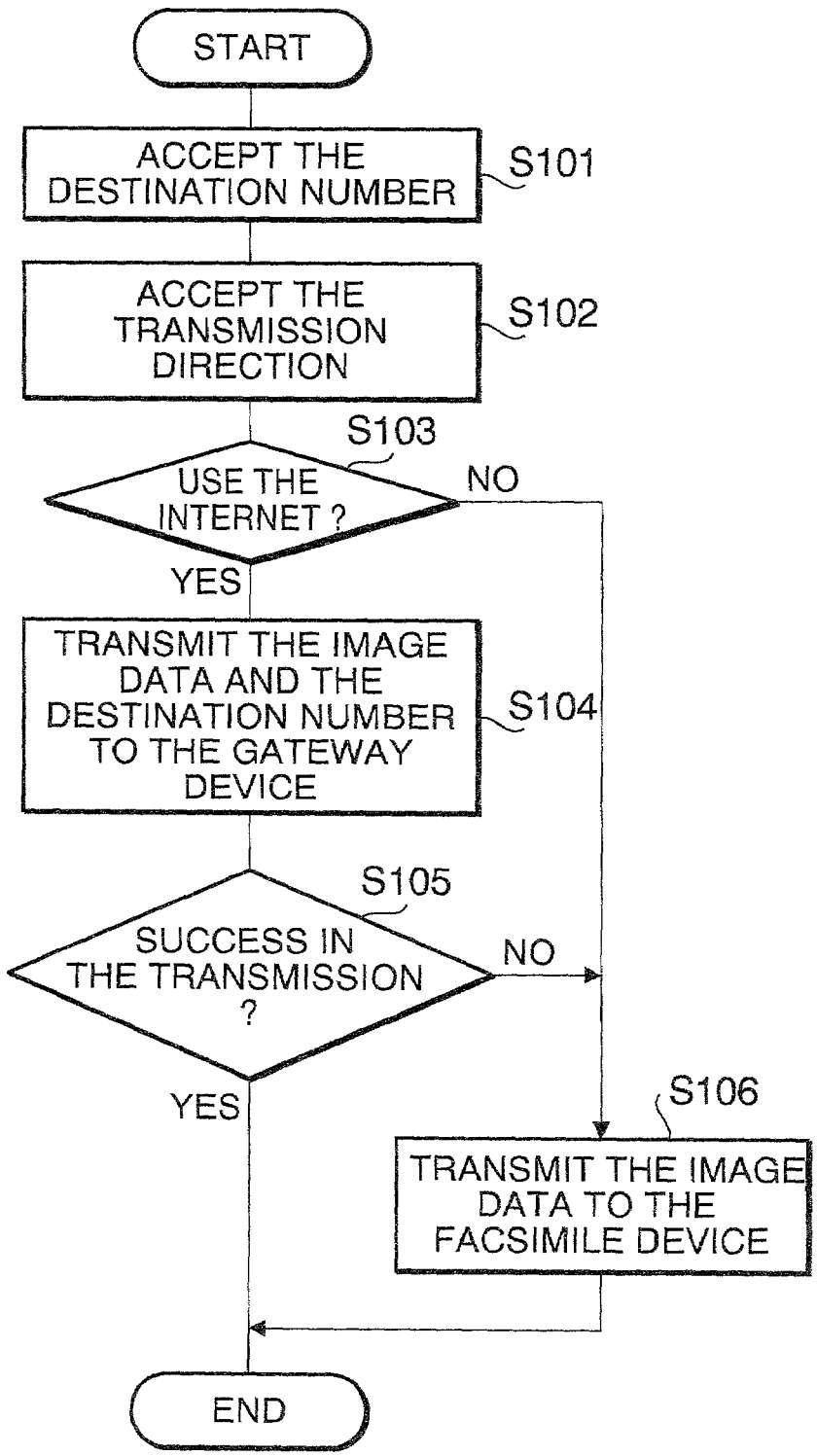

FIG. 5

| ABBREVIATION | FACSIMILE NUMBER | NAME | NETWORK |
|---|---|---|---|
| S001 | 012−345−7777 | MURATA CORP. | PUBLIC SWITCHED TELEPHONE NETWORK |
| S002 | 012−345−6789 | YAMAMOTO CORP. | PUBLIC SWITCHED TELEPHONE NETWORK |
| S003 | 012−345−6789 | YAMAMOTO CORP. | INTERNET |
| ONE TOUCH A | 012−345−6666 | TANAKA ELECTRIC CORP. | PUBLIC SWITCHED TELEPHONE NETWORK |
| ONE TOUCH B | 098−765−4321 | ABC INDUSTRIAL CORP. | INTERNET |

FIG. 8

| AREA CODE | IP ADDRESS |
|---|---|
| 03 | ○○○.×××.△△△.□□□ |
| 06 | ×××.△△△.□□□.○○○ |
| 075 | △△△.□□□.○○○.××× |

FIG. 9

| BEGINNING NUMBER | NETWORK |
|---|---|
| NONE | INTERNAL NETWORK |
| 0 | PUBLIC SWITCHED TELEPHONE NETWORK |
| * | INTERNET |

FIG. 13

Date:01.MAY.3
From:jujo@kyoto.or.jp
To:abc@abc.or.jp
Subject:TIFF(G3)
Cc:

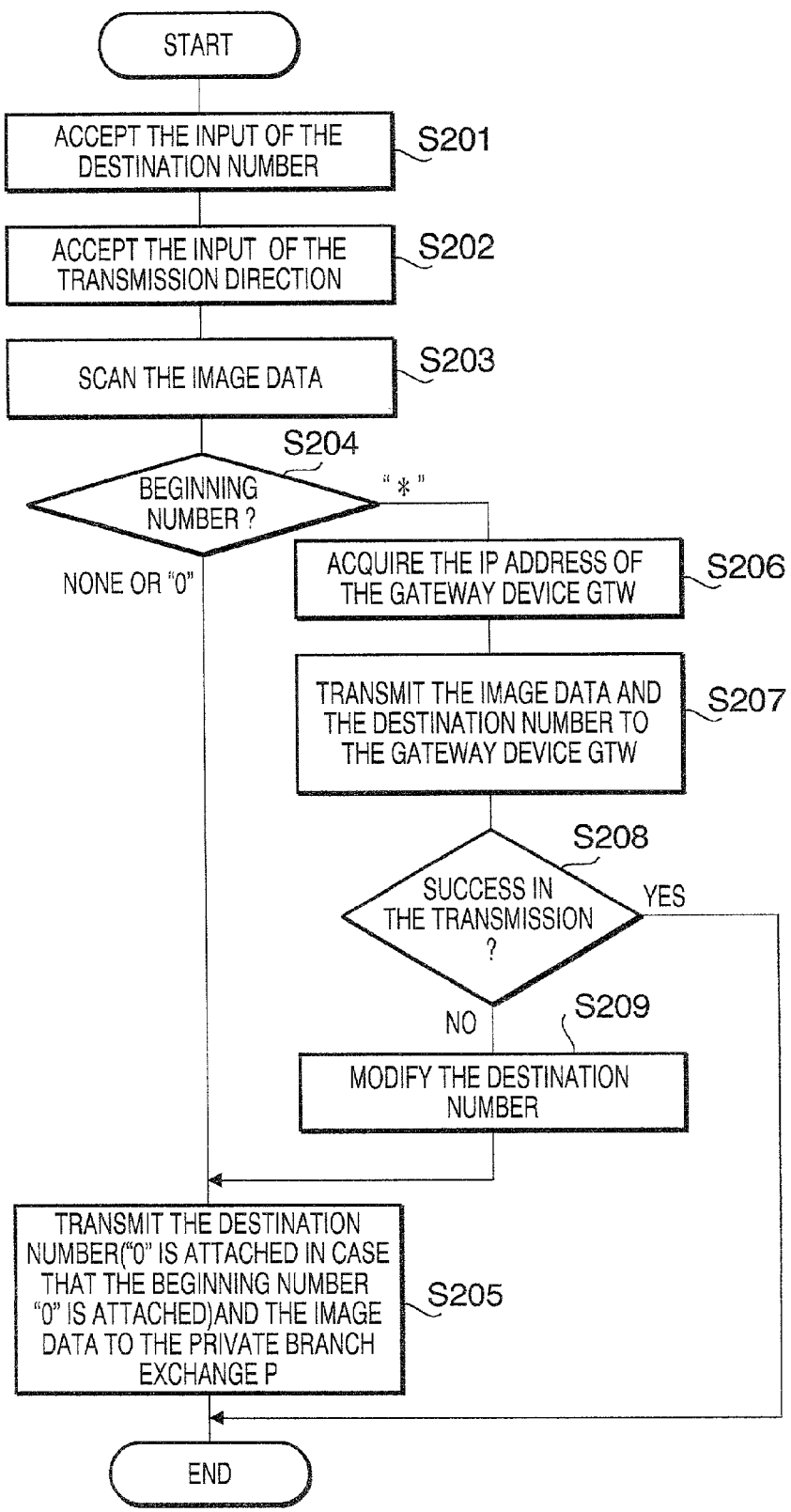

| ABBREVIATION · ONE-TOUCH DIAL | DESTINATION NUMBER | NAME | NETWORK |
|---|---|---|---|
| S001 | 2233 | MURATA CORP. | INTERNAL NETWORK |
| S002 | 012-345-6789 | YAMAMOTO CORP. | PUBLIC SWITCHED TELEPHONE NETWORK |
| S003 | 012-345-6789 | YAMAMOTO CORP. | INTERNET |
| ONE TOUCH A | 012-345-6666 | TANAKA ELECTRIC CORP. | PUBLIC SWITCHED TELEPHONE NETWORK |
| ONE TOUCH B | 098-765-4321 | ABC INDUSTRIAL CORP. | INTERNET |

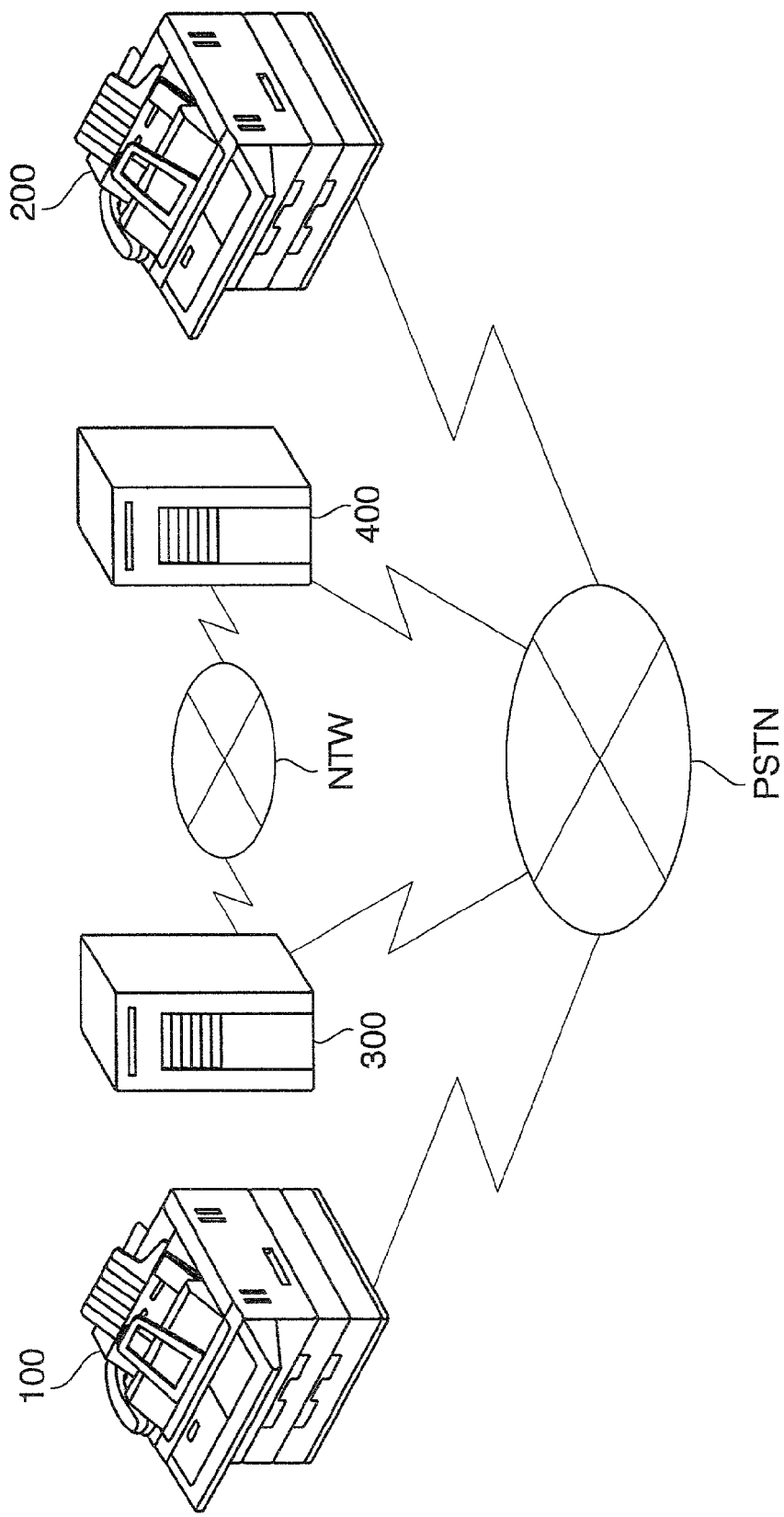

FACSIMILE DEVICE

CROSS REFERENCES TO RELATED APPLICATIONS

This application claims priority of Japanese Patent Application No.2000-339677, No.2000-339678, No.2000-339679 and No.2000-339680 filed in JPO together on Nov. 7, 2000, the entire disclosures of which are incorporated herein by reference.

BACKGROUND OF THE INVENTION

1. Field of the Invention

The present invention relates to a facsimile device, which cannot only carry out ordinary facsimile communication via a public switched telephone network but also implement real-time internet facsimile communication by the ITU-T T.38 recommendation protocol of International Telecommunication Union (ITU) or send image data of facsimile communication as an email attachment file via a gateway device connected to a computer network like the Internet.

2. Description of the Related Art

In recent years, more people use the computer communication network, which can receive and send various data via the more networked Internet by connecting LAN (Local Area Network) to a communication line. In case of using the communication network like this, users can communicate with computers all over the world by only bearing the communications cost (connection fees and communications fee to ISP (Internet Service Providers)) to the nearest ISP.

The send and receive process of image data between facsimile device in case that facsimile communication is carried out by using either protocol, T.38 or SMTP via the gateway device connected to the Internet as a computer communication network will be described below, with reference to FIG. 12.

FIG. 12 shows a transmitting facsimile device 100 and a receiving facsimile device 200. Moreover, 300 shows a transmitting gateway device and 400 shows a receiving gateway device, respectively. The gateway device here means the device having a function to connect a public switched telephone network PSTN to the Internet NTW, and it is installed in the above ISP or the like. Moreover, these gateway devices 300 and 400 have a facsimile communication function by T.30 protocol, a real-time Internet facsimile communication function by T.38 protocol and an email communication function by SMTP.

First, the case of using the communication function by T.38 protocol will be described. The facsimile device 100 modulates the transmitting image data to an analogue audio signal, and sends it to the gateway device 300 via the public switched telephone network PSTN by the conventional facsimile communication protocol (T.30 protocol). Next, the gateway device 300 demodulates the analogue audio signal of the received image data from the facsimile device 100 to the digital signal, and sends it to the gateway device 400 via the Internet NTW by T.38 protocol. Moreover, the gateway device 400 modulates the received digital signal from the gateway device 300 to the analogue audio signal, and sends it to the facsimile device 200 via the public switched telephone network PSTN according to the conventional facsimile communication protocol. Therefore, the facsimile device 200 can receive the received image data from the facsimile device 100 in real time, by demodulating the analogue audio signal transmitted from the gateway device 400 to image data.

Moreover, as mentioned above, the communication between the facsimile device 100 and the gateway device 300 and between the gateway device 400 and the facsimile device 200 is implemented according to the ITU-T T.30 recommendation of International Telecommunication Union (ITU), which prescribes facsimile communication using the public switched telephone network. Moreover, the communication between the gateway device 300 and the gateway device 400 is carried out according to the T.38 recommendation by ITU, which prescribes facsimile communication using the computer communication network.

Next, the case of using the email function by SMTP will be described with reference to the above-mentioned FIG. 6. The facsimile device 100 modulates transmitting image data to an analogue audio signal by the conventional facsimile communication protocol, and sends it to the gateway device 300 via the public switched telephone network PSTN.

The gateway device 300 demodulates the received analogue audio signal from the facsimile device 100 to image data, and converts this to TIFF format (Tagged Image File Format) that is a general image format used in computers. Moreover, the specification of TIFF is open to the public by Adobe System Co., and the corresponding classes are defined in order to deal with various data of not only black and white but also multivalued monochrome and full color and the like. The G3-type image data is defined in the CLASS F, one of those classes. Accordingly, the receiving image data from the facsimile device 100 can be converted to TIFF format by doing the relatively easy process such as to put the TIFF header information of CLASS F to the beginning of the image data. Hereafter, the facsimile image data attached the TIFF header information of CLASS F is called "TIFF image data".

Next, the gateway device 300 converts a binary data of TIFF image data to text data, as some computers which cannot deal with the email by the binary data are also connected to the Internet. Therefore, in case of sending the binary data like TIFF image data, the data is converted to a text data first and transmitted in order to send email certainly to the destination. By the way, the text data handled in the Internet is prescribed as a 7-bit code in RFC (Request For Comments) 822 that is the document published by IETF (Internet Engineering Task Force).

Consequently, to cite one example, using the base 64, one of the encoding types of MIME (Multipurpose Internet Mail Extensions), the binary data is converted to the text data by being replaced by one of the 64-type characters (uppercase and lowercase alphabet, number, +, /) by a 6-bit unit. By the way, MIME is prescribed in the aforementioned RFC, and encoding types like "7bit", "8bit" and "binary" are also prescribed as well as the above-mentioned base 64, for example.

Next, the gateway device 300 changes the transmitting file to the email format. To be more precise, the file is edited to the email format by putting TIFF image data converted to text data to the mail header information as the communication management information. The operation by the gateway device 300 like this is essential as the Internet email is prescribed to put the prescribed header information, and in transmitting, the header information, comprising "Date:" (time of origin of the email), "From:" (sender of the email), "To:" (destination of the email), "Subject:" (title of the email, to be more precise, the encoded system) and "Cc:" (destination of the email copy), is added to the beginning of TIFF image data as shown in FIG. 13.

Next, the gateway device 300 sends the email prepared as shown in the above to the gateway device 400 via the Internet NTW by SMTP, and the gateway device 400 separates the body and the communication management information (mail header) from the email received from the gateway device 200 and picks up only TIFF image data converted to text data and converted this to the TIFF format that is a binary data. Moreover, after converting to image data in the ordinary facsimile method, the data is transmitted to the facsimile device 200 by the conventional facsimile communication protocol.

The facsimile communication using the computer communication network (the Internet NTW) between the facsimile device 100 and the facsimile device 200 can be implemented via the gateways 300 and 400 connected by the Internet NTW, having T.38 protocol or SMTP function like this.

However, as mentioned above, in case that facsimile communication is implemented using the Internet NTW even in using either protocol, T.38 or SMTP, the transmitting-side facsimile device 100 does not call for the receiving-side facsimile device 200, but the transmitting-side gateway device 300 is called for via the public switched telephone network PSTN. Accordingly, in this case, the facsimile number (the telephone number) of the receiving-side facsimile device 200 needs to be delivered to the transmitting-side gateway device 300. Accordingly, in case of transmitting an image data from the facsimile device 100 to the facsimile device 200, users must specify both telephone numbers of the gateway device 300 and the facsimile device 200, and the operation becomes confusing.

Moreover, as the communication via the Internet is so called the connectionless type communication, there is not much reliability compared with connection oriented type communication. Accordingly, in case that facsimile communication is implemented via the Internet NTW compared with the case of using only the public switched telephone network, the communication between the gateway devices 300 and 400 is not completed properly and the possibility that the facsimile device 200 cannot receive image data is higher than ordinary facsimile communication using only the public switched telephone network.

SUMMARY OF THE INVENTION

The present invention is provided in view of the above-described situation, and it is an object of the present invention to provide a facsimile device which can send image data using the requested network without users doing confusing operation by deciding that image data is transmitted directly to the communication device using the public switched telephone network or that image data is transmitted using the computer network via the gateway device according to the content of the network information in case of inputting the discrimination information of the communication device like the receiving-side facsimile device, which includes the network information that which network is used, public switched telephone network or computer communication network (the Internet).

Moreover, it is another advantage of the present invention to provide a facsimile device which can send image data using the proper network automatically without users doing special operation, by deciding that image data is transmitted directly to the communication device using the public switched telephone network or that image data is transmitted using the computer communication network via the gateway device according to the content of the network information corresponding to the discrimination information, in case of accepting the discrimination information by memorizing the discrimination information of the receiving-side communication device and the network information showing the available network by making one of these information correspond to the other information.

Furthermore, it is another advantage of the present invention to provide a facsimile device which can certainly carry out the transmission process of image data by sending the same image data directly to the communication device using the public switched telephone network in case of failing in the transmission process of image data using the computer communication network.

Furthermore, it is another advantage of the present invention to provide a facsimile device which can transmit image data easily using the requested network, without users compulsively performing the confusing operation, by transmitting image data using the network shown in the network information in case of inputting the discrimination information such as the destination facsimile number that attached the network information showing which network is used between the public switched telephone network or the computer communication network, by having a means for connecting the facsimile device to the computer communication network.

Furthermore, it is another advantage of the present invention to provide a facsimile device which can send image data using the proper network automatically, without users performing the special operation, by sending image data using the network shown in the network information made to correspond to the discrimination information in case of selecting the discrimination information by users, by memorizing by making the receiving discrimination information correspond to the network information showing which network is used, by having a means for connecting the facsimile device to the computer communication network.

The facsimile device regarding the first invention characterizes in having the means for communicating via the respective gateway devices which connect the communication device connected to the public switched telephone network and via the aforementioned public switched telephone network to the computer communication network and via the above public switched telephone network, and the means for transmitting image data to the above communication device or transmitting image data and the discrimination information to the aforementioned gateway device based on the network information in case of inputting the destination discrimination information and the network information of an image data.

In the first invention, in case of inputting the discrimination information of the communication device such as the receiving-side facsimile device, which is attached the network information showing which network is used, the public switched telephone network or the computer communication network, whether only the public switched telephone network is used or the computer communication network is used is determined with reference to the network information. In case of determining to use only the public switched telephone network as the result, an image data is transmitted directly to the communication device, on the other hand, in case of determining to use the computer communication network, an image data is transmitted to the communication device via the gateway device.

The network information mentioned above can be expressed by putting the certain number or the mark ("*", "#" etc.) to the beginning of the destination facsimile number, for example. In this case, image data can be transmitted using the requested network without doing the special operation but specifying the facsimile number with these numbers or mark.

The facsimile device regarding the second invention characterizes in having a means for communicating via the respective gateway device connecting the communication device connected to the public switched telephone network and the aforementioned public switched telephone network to the computer communication network and via the aforementioned public switched telephone network, a means for memorizing the discrimination information of the destination of image data and the information corresponding to the network information showing the network to use and a means for transmitting image data to the aforementioned communication device and transmitting image data and the discrimination information to the above gateway device based on the corresponding information.

In the second invention, the corresponding information which makes the discrimination information of the receiving-side communication device correspond to the network information showing which network is used, public switched telephone network or computer communication network is memorized, and the network information corresponded to the aforementioned discrimination information is confirmed with reference to the aforementioned corresponding information in case of accepting the discrimination information. Moreover, whether only the public switched telephone network is used or the computer communication network is used is judged by the content of the network information. In case of judging to use only the public switched telephone network as the result, an image data is transmitted directly to the communication device, on the other hand in case of judging to use the computer communication network, an image data is transmitted to the communication device via the gateway device.

Whether only the public switched telephone network is used or the computer communication network is used is properly decided automatically, based on the corresponding pre-memorized information. Accordingly, users do not need to be aware of which network is used, and there is no need to do special operation.

The facsimile device regarding the third invention, in the facsimile device regarding the first invention and the second invention, further includes a means for determining whether the transmission of image data using the aforementioned computer communication network is completed or not and a retransmission means which transmits image data to the aforementioned communication device in case of judging not to complete the above transmission.

In the third invention, as the transmission process of image data using the computer communication network fails, the image data is transmitted directly to the communication device using the public switched telephone network. Therefore, image data can be certainly transmitted to the destination.

The facsimile device regarding the forth invention characterizes in having a means for connecting the communication device to the public switched telephone network and the computer communication network and a means for transmitting image data to the aforementioned destination using the network shown in the aforementioned network information in case of inputting the destination discrimination information of image data, which is attached the network information showing which network is used.

In the forth invention, the device is connected to both the public switched telephone network and the computer communication network, and in case that users input the destination discrimination information of image data, which is attached the network information showing which network is used in these networks, the image data is transmitted to the destination using the network shown in the input network information.

The image data can be transmitted directly to the computer communication network without going through the process such as communicating with the gateway device via the public switched telephone network each time even in the case of using the computer communication network by providing a means for connecting the communication device to the computer communication network like this.

Moreover, the network information mentioned above can be expressed by putting the certain number or the mark ("*", "#" etc.) to the beginning of the destination facsimile number. In this case, users can select the requested network by only specifying the facsimile number with these numbers or a mark. That is why the special operation is not needed.

The facsimile device regarding the fifth invention comprises a means for connecting to the public switched telephone network and the computer communication network, a means for memorizing both the destination discrimination information of image data and the network information showing which network is used, public switched telephone network or computer communication network by making correspond to each other, and a means for transmitting image data to the above destination using the network shown in the network information made to correspond to the discrimination information in case that the discrimination information is selected.

In the fifth invention, the device is connected to both the public switched telephone network and the computer communication network, and both the destination discrimination information of image data and the network information showing that which network is used in these networks are memorized by making correspond to each other. Moreover, in case that users select the destination discrimination information of image data, the image data is transmitted to the destination using the network shown in the network information with reference to the network information that is memorized by making the network information correspond to the discrimination information.

Whether the public switched telephone network is used or the computer communication network is used is properly determined automatically, based on both the discrimination information of the destination and the network information both memorized by making correspond to each other that in advance, and the transmission of image data using the decided network is implemented. Accordingly, users need not to be aware of which network is used without doing the special operation but inputting the discrimination information of the destination.

Moreover, image data can be transmitted directly to the computer communication network without going through the process such as communicating with the gateway device via the public switched telephone network every time, even in case of using the computer communication network, by providing a means for connecting the communication device to the computer communication network.

The facsimile device regarding the sixth invention, in the facsimile device regarding the forth invention and the fifth invention, characterizes in that a means for connecting the facsimile device to the aforementioned public switched telephone network is composed so as to connect the facsimile device to the public switched telephone network via an private branch exchange which is connected to the internal network and the aforementioned network information shows which network is used, internal network, public switched telephone network or computer communication network.

In the sixth invention, the facsimile device of the present invention is connected to the public switched telephone network via the PBX (Private Branch Exchange), which is connected to the internal network. Moreover, image data is transmitted to the destination by using either network, the internal network, the public switched telephone network or the computer communication network which are shown in the network information.

Therefore, image data can be transmitted to the facsimile device connected to the internal network or the public switched telephone network via the private branch exchange by users only inputting the discrimination information.

The facsimile device regarding the seventh invention, in the facsimile device regarding either the forth or the sixth invention, characterizes in also having a means that the transmission of image data to the aforementioned computer communication network is implemented in real time by T.38 protocol.

In the seventh invention, the transmission of image data to the computer communication network is implemented in real time by T.38 protocol.

The facsimile device regarding the eighth invention, in the facsimile device regarding either the forth or the sixth invention, characterizes in further having a means that the transmission of image data to the aforementioned computer communication network is implemented in the email method by SMTP (Simple Mail Transfer Protocol).

In the eighth invention, the communication of image data to the computer communication network is implemented in the email method by SMTP.

BRIEF DESCRIPTION OF THE DRAWINGS

FIG. 2 is a block diagram, showing the structure of facsimile device in the embodiment 1 of the present invention.

FIG. 3 is an illustrative diagram, which shows an example of the corresponding table.

FIG. 4 is a flowchart, showing the operation flow of the facsimile device in case of transmitting an image data by either facsimile device.

FIG. 5 is an illustrative diagram, showing an example of the corresponding table.

FIG. 8 is an illustrative diagram, showing an example of the corresponding table.

FIG. 9 is an illustrative diagram, showing an example of the corresponding table.

FIG. 10 is a flowchart, showing the operation flow of the facsimile device in the embodiment 3 of the present invention in case of transmitting image data.

FIG. 11 is an illustrative diagram, showing an example of the corresponding table.

FIG. 12 is an illustrative diagram of the transmitting and receiving process of image data between facsimile devices in case of implementing the facsimile communication using either T.38 or SMTP protocol via the Internet as a computer communication network.

FIG. 13 is a scheme, showing an example of the content of the email header in case of implementing the facsimile communication using SMTP via the Internet as a computer communication network.

DETAILED DESCRIPTION OF THE INVENTION

The present invention will be described below with reference to the drawings which show the embodiments.

(Embodiment 1)

Figure 1:
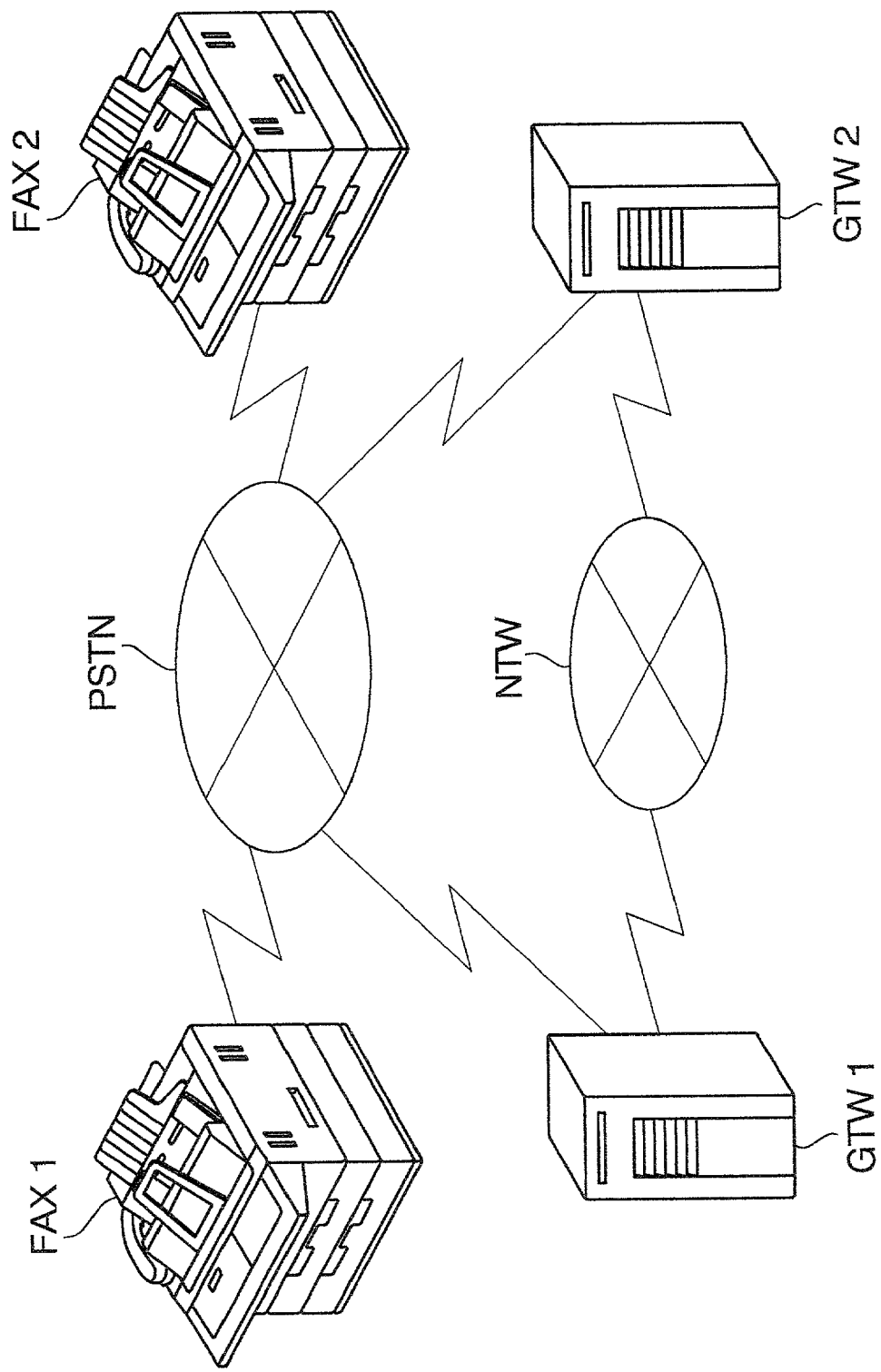
FIG. 1 is a block diagram, showing the structural example of the facsimile devices in an embodiment 1 of the present invention and the public switched telephone network and the computer communication network connected to the facsimile devices.

FIG. 1 is a block diagram, showing the structural example of the facsimile device in the embodiment 1 of the present invention and the public switched telephone network and the computer communication network connected to the facsimile device. In FIG. 1, FAX1 and FAX2 shows facsimile devices, and those facsimile devices FAX1 and FAX2 are connected via the public switched telephone network PSTN. Therefore, image data can be received and transmitted between the facsimile devices FAX1 and FAX2 by the ordinary facsimile communication method using only the public switched telephone network PSTN.

Moreover, the facsimile devices FAX1 and FAX2 are connected to the gateway devices GTW1 and GTW2 having the function to connect the public switched telephone network PSTN and the Internet NTW via the public switched telephone network PSTN. The receiving and transmitting of image data can be implemented by the facsimile communication via the Internet NTW between the facsimile devices FAX1 and FAX2 by going through these gateway devices GTW1 and GTW2.

Moreover, the receiving and transmitting of image data by facsimile communication via the Internet NTW between both the gateway devices GTW1 and GTW2 can be implemented in case of whether the real-time Internet by T.38 or the email using SMTP, or in case of using both selectively.

FIG. 2 is a block diagram, showing the structure of the facsimile devices FAX1 and FAX2 in the embodiment 1 of the present invention. In FIG. 2, a main control part 1 composed by CPU is connected to each part of the following hardware via a bus 20, and various programs stored in ROM4 is implemented with controlling them.

Modem 2 modulates and demodulates the receiving data and the transmitting data. To be more precise, transmit data that is originally a digital signal is modulated to an analogue audio signal and sends it from a line L to the public switched telephone network PSTN via NCU 3, and adversely, the analogue audio signal received from the public switched telephone network PSTN via the line L and NCU 3 is demodulated to the digital signal.

NCU 3 not only controls the connection between the public switched telephone network PSTN and the facsimile devices FAX1 and FAX2 via the line L, but also has the function of transmitting the DTMF or the dial pulse corresponding to the facsimile number of the destination and also has the function to detect the call incoming. And also, if necessary, NCU3 connects modem 2 to the public switched telephone network PSTN via the line L.

ROM 4 stores various software programs necessary for the operation of the facsimile devices FAX1 and FAX2. Moreover, RAM 5 consists of SRAM or flash memory and the like and memorizes the temporary data generated in executing software. In case of using flash memory in RAM 5, however, the memory content is not lost even in the case of failing power due to blackout or the movement of the facsimile device and the like.

The first corresponding table 51 shown in FIG. 3 which shows the relation between the number as a network information attached in beginning of the destination facsimile number (hereafter, the number is called the beginning number) and the available communication network is stored in the proper area of the RAM 5. This first corresponding table 51 can be deleted, updated and added by the operation of users. As shown in FIG. 3, in the first corresponding table 51, the public switched telephone network PSTN is made to correspond to the beginning number "NONE" in case of not existing the beginning number, and the Internet NTW is made to correspond to the beginning number "*" in case that the beginning number is "*".

And likewise, the telephone number of a gateway device GTW1 is stored in the proper area of this RAM 5. The telephone number of this gateway device GTW1 can be also deleted, updated and added by the operation of users.

An image memory 6 consists of DRAM etc. for example, and stores image data that is scanned by the after-mentioned scanning part 9, and stores the received image data from outside via the public switched telephone network PSTN, the line L and the modem 2.

A display 7 is the display unit of LCD (liquid-crystal display) or CRT display etc., and represents the operating state of the facsimile devices FAX1 and FAX2, the image data of the transmitting manuscript and the received image data and the using condition of the network etc.

An operation part 8 is equipped with alphabet keys, ten keys (numeric keys), one-touch dial key, abbreviated dial key and various function keys for operating the facsimile devices FAX1 and FAX2. The scanning part 9 scans the copy image by using a scanner like CCD image sensor, for example.

A recording part 10 is a printer device adopting the electronograph method for example, and selects the proper size recording paper like the A3 (Short Edge Feeding), B4 (Short Edge Feeding), A4 (Short Edge Feeding), B5 (Long Edge Feeding) and A5 (Long Edge Feeding) sized recording papers and records the received image data as a hard copy on a selected paper.

Next, the operation of the facsimile devices FAX1 and FAX2 in the embodiment 1 of the present invention will be described.

FIG. 4 is a flowchart, showing the operation flow of this facsimile device FAX1 in case that one facsimile device FAX1 transmits image data.

Users input the destination number that is the facsimile number of the destination facsimile device FAX2, using ten key etc. which the operation part 8 is equipped with. Here, the destination number is input without change in case that facsimile communication using only the public switched telephone network PSTN is implemented, and on the other hand, the destination number attached "*" as a beginning number is input in case that facsimile communication using the Internet NTW is implemented.

The facsimile device FAX1 accepts the destination number input by users as mentioned above (S101), and also accepts the transmission direction that is the direction of transmitting image data to the destination number (S102).

Next, by confirming whether "*" is attached or not as the beginning number to the destination number accepted in the step S101, whether only the public switched telephone network PSTN is used or the Internet NTW is used is determined (S103). Here, in case that only the public switched telephone network PSTN is determined to use as the beginning number is not prepared (NO in S103), after the image data that is the transmitting copy is scanned by the scanning part 9 and stored in the image memory 6, the aforementioned accepted destination number is designated and the aforementioned image data is transmitted to the facsimile device FAX2 according to the ordinary facsimile communication protocol (S106). Therefore, image data is transmitted to the facsimile device FAX2 via only the public switched telephone network PSTN.

Meanwhile, in case that "*" is judged to attach as the beginning number in the step S103, that is the case that the Internet NTW is judged to use (YES in S103), after image data is stored in the image memory 6, the telephone number of the gateway device GTW1 stored in RAM 5 is called and the aforementioned image data and the destination number accepted in the step S101 is transmitted to the gateway device GTW1 (S104). The nonstandard procedure signal prescribed in T.30 protocol can be used in order that the destination number is notified to the gateway device GTW1.

Accordingly, image data is transmitted to the facsimile device FAX2 via the gateway device GTW1, the Internet NTW and the gateway device GTW2 even in case that the communication by either T.38 protocol or SMTP is implemented between the gateway devices GTW1 and GTW2.

Next, the facsimile device FAX1 judges whether the transmission of image data is succeeded or not (S105). This judgment is implemented by, for example, receiving the information showing that the transmission process from the gateway device GTW1 is properly completed (or the information showing that it is not properly completed) after the step S104 is implemented. The process is terminated in case that the transmission is judged to succeed (YES in S105).

On the other hand, in case that the transmission is judged to fail in the step S105 (NO in S105), by implementing the step S106 mentioned above, image data is transmitted to the facsimile device FAX2 via only the public switched telephone network PSTN by the ordinary facsimile communication protocol.

In this way, whether only the public switched telephone network PSTN is used or the Internet NTW is used can be selected only by whether attaching "*" as the beginning number or not like without users doing the confusing operation. Moreover, as image data is not properly transmitted in case of using the Internet NTW, image data is retransmitted automatically using only the public switched telephone network PSTN and the transmission process is surely completed.

(Embodiment 2)

Regarding the facsimile devices FAX1 and FAX2 in the embodiment 2 of the present invention, the second corresponding table 52 shown in FIG. 5 instead of the first corresponding table 51 in the embodiment 1 is stored in the proper area of RAM 5. This second corresponding table 52 shows the relation with the abbreviated number, the facsimile number, the destination name corresponding to the facsimile number and the available communication network used as the network information. This second corresponding table 52 can be deleted, updated and added by users' operation.

Moreover, the diagrammatic representation and the explanation of the other component are omitted, as the component is same as the one in the embodiment 1.

Next, the operation of the facsimile devices FAX1 and FAX2 in the embodiment 2 of the present invention will be described.

The facsimile number is accepted as the destination number of the facsimile device FAX2 in the step 101 from users in the embodiment 1, however, there are times when the abbreviated number corresponded to the facsimile number other than the facsimile number is accepted in the embodiment 2.

Moreover, in case of the embodiment 1, the beginning number is confirmed in order to judge whether only the public switched telephone network PSTN is used or the Internet NTW is used in the step S103, however, in case of the embodiment 2, which communication network is used is judged by confirming the communication network made to correspond to the abbreviated number or the communication network corresponded to one-touch dial key that is the aforementioned accepted destination number with reference to the second corresponding table 52 stored in RAM 5. Moreover, the explanation of the other process is omitted, as the process is the same as the one in the embodiment 1.

In this way, image data can be transmitted using the proper communication network automatically by only putting the abbreviated number or the facsimile number as well as in the ordinary case without users doing the special operation. Moreover, as well as in the case of the embodiment 1, when image data cannot be transmitted properly in case of using the Internet NTW, the retransmission of image data is implemented automatically using only the public switched telephone network PSTN, and the transmission process is surely completed.

Moreover, the communication via the computer communication network (Internet) between the gateway devices GTW1 and GTW2 is implemented by either T.38 protocol or SMTP protocol in the above-mentioned first and second embodiments, however the protocol is not confined to these protocols and the other protocols can be also used if facsimile image data can be received or transmitted.

(Embodiment 3)

Figure 6:
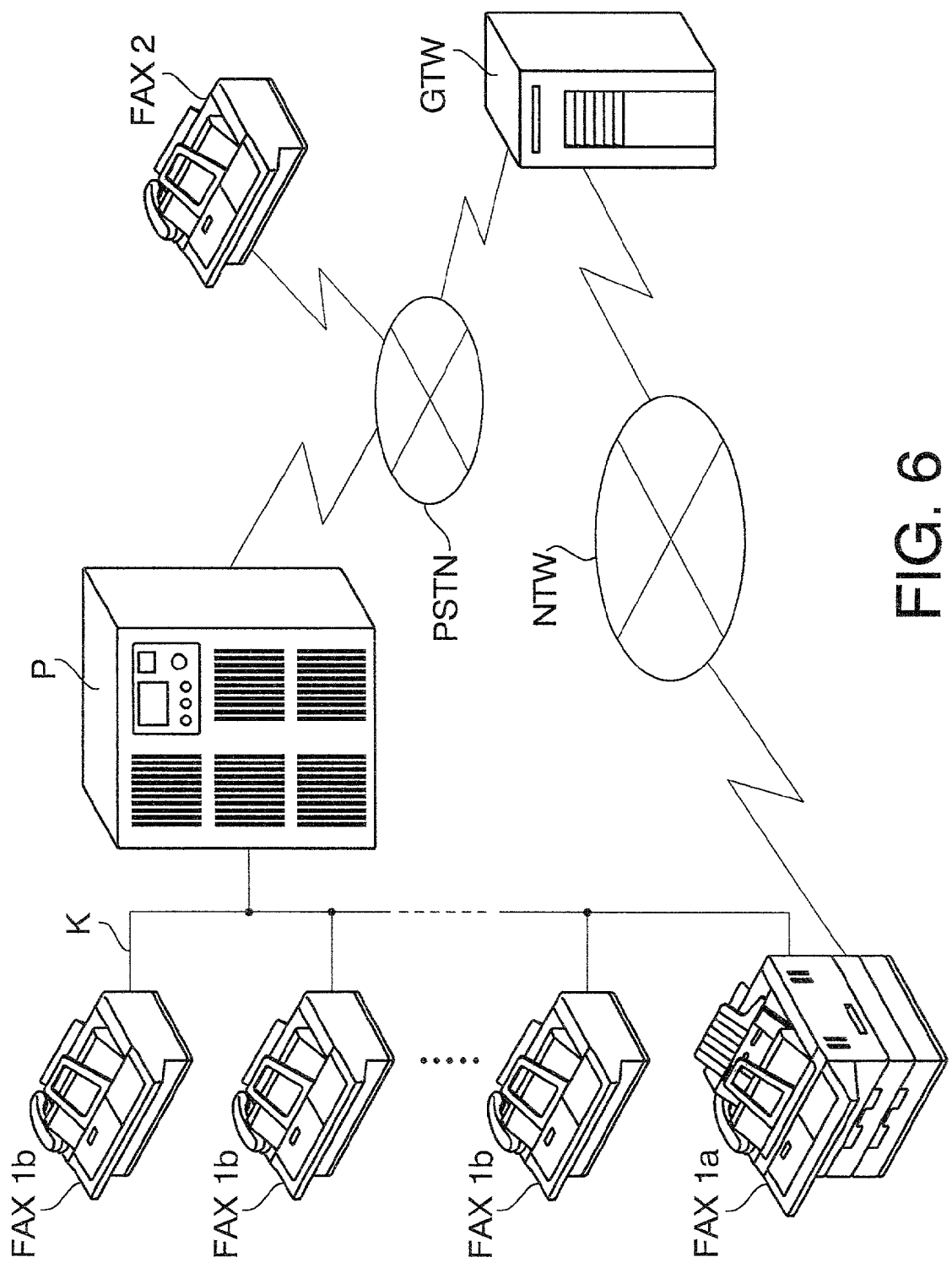
FIG. 6 is a block diagram, showing the structural example of the facsimile devices in an embodiment 3 of the present invention, the internal network, the public switched telephone network and the computer communication network, to any one of which the facsimile device is connected.

FIG. 6 is a block diagram, showing structure example of the facsimile device in the embodiment 3 of the present invention and the internal network, the public switched telephone network and the computer communication network that the facsimile device is connected. FIG. 6 shows the facsimile device FAX1a. The facsimile device FAX1a is connected to an internal network K and the Internet NTW, and it is also connected to the public switched telephone network PSTN via the after-mentioned private branch exchange P.

The above-mentioned private branch exchange P is an exchange having only the line connecting function that the speech channel is set in case that the facsimile devices FAX1a, FAX1b and FAX1b . . . connected to the internal network K communicate each other or in case that these facsimile devices FAX1a, FAX1b, FAX1b . . . and the facsimile device FAX2 connected to the public switched telephone network PSTN communicate. By the way, the communication among the respective facsimile devices is implemented according to ITU-T T.30 recommendation.

Moreover, GTW shows the gateway device having the function connecting the public switched telephone network PSTN and the Internet NTW, and image data can be transmitted and received using the Internet NTW between the facsimile devices FAX1a and FAX2 via this gateway device GTW mentioned later. Moreover, either real-time facsimile communication by T.38 recommendation protocol by ITU that prescribes facsimile communication using the computer communication network or the email method facsimile communication by SMTP can be available between the facsimile device FAX1a and the gateway device GTW.

As mentioned above, in this embodiment of the present invention, the facsimile device FAX1a is connected to the public switched telephone network PSTN via the private branch exchange P, however the structure to connect with the public switched telephone network PSTN directly can also be available.

Figure 7:
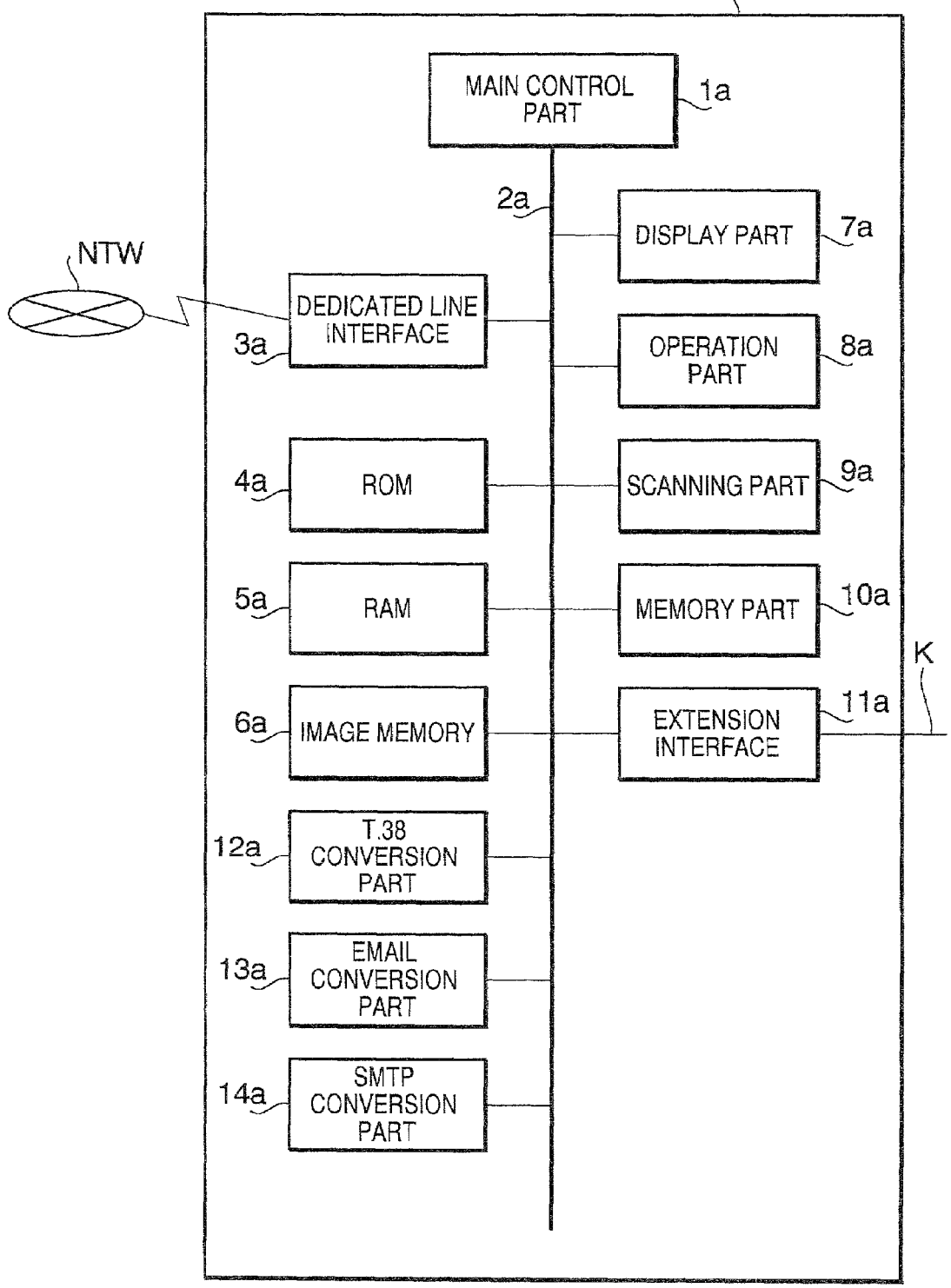
FIG. 7 is a block diagram, showing the structure of the facsimile device in the embodiment 3 of the present invention.

FIG. 7 is a block diagram, showing the structure of the facsimile device FAX1a in the embodiment 3 of the present invention. In FIG. 7, 1a shows the main control part composed by CPU and the corresponding main control part 1a is connected to each part of the following hardware via a bus 2a and the various programs stored in ROM 4a is implemented as well as controlling them.

A dedicated line interface 3a is the communication interface for controlling the connection between the dedicated line used to connect to the Internet NTW and the facsimile device FAX1a. The data protocol-converted by T.38 conversion part 12a and SMTP conversion part 14a can be transmitted and received among the communication devices such as the gateway device GTW connected to the Internet NTW via this communication interface.

Moreover, as the protocol conversion by the T.38 conversion part 12a and SMTP conversion part 14a is publicly known, the explanation is omitted. However, in case that communication via the Internet NTW by SMTP conversion part 14a is implemented, the conversion to the email method of the facsimile image data by an email conversion part 13a and the opposite conversion to the facsimile image data of email method are needed, but the explanation is omitted as this process is also publicly known as mentioned above.

Moreover, the receiving and transmitting of image data by facsimile communication via the Internet NTW in between the facsimile device FAX1a and the gateway device GTW can be available in case of either the real-time internet by T.38 protocol or the email using SMTP, or in case that both are used selectively. Accordingly, it goes without saying that the gateway device GTW is also equipped with T.38 conversion part 12a, the email conversion part 13a and the SMTP conversion part 14a as well as the above-mentioned facsimile device FAX1.

Various software programs necessary for the operation of the facsimile device FAX1a are stored in ROM 4a. Moreover, RAM 5a consists of, for example, SRAM or flash memory etc., and memorizes the temporary data generated in executing software. Moreover, in case of using flash memory in RAM 5a, the memory contents are not failed even in the case of blackout or cutting off power for moving the facsimile device etc.

The after-mentioned two corresponding tables are stored in the proper area of this RAM 5a. Moreover, these corresponding tables can be deleted, updated or added by users operation.

The third corresponding table is a table showing the code area and the corresponding IP address of the gateway device GTW installed in the corresponding area of the area code, as in the corresponding table 53 shown in FIG. 8. The facsimile device FAX1a can confirm the IP address of the destination gateway device GTW with reference to the third corresponding table 53.

The forth corresponding table is a table showing the correspondence between the number attached in the beginning of the destination facsimile number (hereafter, the number is called the beginning number) and the available communication network, as in the corresponding table 54 shown in FIG. 9. As shown in FIG. 9, in the corresponding table 54, the internal network K is made to correspond to "NONE" in case that the beginning number does not exist, and the public switched telephone network PSTN is made to correspond to "0" in case that the beginning number is "0", and the Internet NTW is made to correspond to "*" in case that the beginning number is "*".

Moreover, an image memory 6a, comprising, for example, DRAM etc., stores image data scanned by the after-mentioned scanning part 9a and stores the received data via the public switched telephone network PSTN etc. from outside.

A display part 7a is the display device like liquid-crystal display (LCD) or CRT display, and displays the operating condition of the facsimile device FAX1a and displays the image data of transmitting copy, the received image data and the using condition of the network.

An operation part 8a is equipped with alphabet keys, ten keys (numeric keys), one-touch dial key, abbreviated dial key and various function keys for operating the facsimile device FAX1a. A scanning part 9a scans the copy image by the scanner such as CCD image sensor.

A recording part 10a is a printer device adopting the electronograph method for example, and selects the proper size recording paper like the A3 (Short Edge Feeding), B4 (Short Edge Feeding), A4 (Short Edge Feeding), B5 (Long Edge Feeding) and A5 (Long Edge Feeding) sized recording papers and records the received image data as a hard copy on a selected paper.

Next, the operation of the facsimile device FAX1a in the embodiment 3 of the present invention will be described.

FIG. 10 is a flowchart, showing the operation flow of the facsimile device FAX1a of the present invention in case that image data is transmitted.

Users input the extension number of the destination facsimile device FAX1b or the destination number that is the facsimile number of the facsimile device FAX2 in the facsimile device FAX1a. Here, the destination number attached "0" as the beginning number is input in case of implementing facsimile communication with the facsimile device FAX2 using only the public switched telephone network PSTN via the internal network K and the private branch exchange P and the destination number attached "*" is input in case of implementing facsimile communication with the facsimile device FAX2 using the Internet NTW. Moreover, the extension number is used as the destination number in case of implementing facsimile communication with either the facsimile devices FAX1b, FAX1b . . . using only the internal network K, but in this case, users input the extension number without change not attaching the beginning number.

The facsimile device FAX1a accepts the input of the destination number input by users as mentioned above (S201), and also accept the input of the transmission direction that is the direction of sending image data to the destination number (S202). Moreover, image data that is a transmission copy is scanned by the scanning part 9a (S203), and the scanned image data is stored in the image memory 6a.

Next, the facsimile device FAX1a performs judging process of the beginning number with reference to the destination number accepted in the step S201 (S204). The aforementioned destination number (the beginning number "0" is attached in case that the beginning number "0" is attached) and image data are transmitted (S205) to the private branch exchange P in case of determining that the beginning number is not attached or in case of determining that the beginning number is "0" ("NONE" or "0" in S204).

The private branch exchange P transmits the aforementioned image data to the aforementioned facsimile device FAX1b or the aforementioned facsimile device FAX2 using the internal network K or the public switched telephone network PSTN according to the destination number (extension number or facsimile number) in case that the destination number and image data is received from the facsimile device FAX1a, to be more precise, in case that the facsimile device FAX1b is called for with internal connection in case of judging that the beginning number is not attached and the facsimile device FAX2 is called for in case of judging that the beginning number is "0" and the facsimile device FAX1b or the facsimile device FAX2 answers.

On the other hand, in case of judging that the beginning number is "*" in the step S204, it is confirmed that the transmission process using the Internet NTW is implemented with reference to the fourth corresponding table 54. Moreover, the IP address of the gateway device GTW installed in the area corresponding to the aforementioned area code is acquired with reference to the area code of the destination number (facsimile number) accepted in the step S201 and the third corresponding table 53 (S206). Moreover, image data stored in the image memory 6 and the destination number is transmitted to the aforementioned gateway device GTW according to ITU T.38 recommendation or SMTP using the Internet NTW by designating the acquired IP address as the destination address (S207).

In this situation, in case that the communication by T.38 protocol is implemented between the facsimile device FAX1a and the gateway device GTW, the facsimile device FAX1a transmits image data by converting to the digital signal according to the rule of T.38 protocol. Moreover, the facsimile device FAX1a transmits image data by converting to the email method mentioned above in case that communication is implemented by SMTP. Image data is transmitted to the gateway device GTW via the Internet NTW from the facsimile device FAX1a even if either communication by T.38 or SMTP is implemented like this.

In case that the aforementioned gateway device GTW receives the image data transmitted like this, the gateway device GTW transmits the image data to the facsimile device FAX2 via the public switched telephone network PSTN according to T.30 mentioned above, based on the received destination number by modulating the received digital signal to the analogue signal if the communication by T.38 protocol is implemented. Moreover, if the communication by SMTP is implemented, the gateway device GTW converts the received email text data to the binary data, and further modulates it to the analogue audio signal by converting to the facsimile image data, based on the received destination number, the data is transmitted to the facsimile device FAX2 via the public switched telephone network PSTN according to T.30 mentioned above. Therefore, the facsimile device FAX2 that is the terminal destination can receive the image data.

Next, the facsimile device FAX1a judges whether the transmission of image data is succeeded or not (S208). This judgment is implemented, for example, by receiving the information showing the transmission process is completed properly (or the information showing the transmission process is not completed properly) from the gateway device GTW after the step S208 is carried out. Moreover, the process is terminated in case that the transmission is judged to succeed (YES in S208).

On the other hand, in case that the transmission is judged to fail in the step 208 (NO in S208), the above-mentioned step S205 is carried out after the modification process (S209) of the destination number is implemented by displacing "*", the beginning number of the destination number accepted in the step S201 to "0". Accordingly, image data is retransmitted to the facsimile device FAX2 using only the public switched telephone network PSTN via the internal network K and the private branch exchange P.

Which network is used, the internal network K, the public switched telephone network PSTN or the Internet NTW can be easily selected by only putting "0" or "*" as the beginning number, without users doing the confusing operation like this. Moreover, in case of selecting the Internet NTW, the facsimile device FAX1a can transmit image data directly to the Internet NTW by either T.38 or SMTP protocol.

Moreover, in case of using the Internet NTW, as there is not much credibility in the communication via the Internet NTW, it is highly probable that the transmission process of image data is not completed properly compared with the case of using only the public switched telephone network PSTN. However, as mentioned above, the facsimile device FAX1a in the embodiment 3 of the present invention can surely complete the transmission process as image data is retransmitted using the public switched telephone network PSTN automatically if image data is not transmitted properly in case of using the Internet NTW.

(Embodiment 4)

The facsimile device FAX1a in the embodiment 4 of the present invention stores the fifth corresponding table 55 shown in FIG. 11 instead of the forth-corresponding table 54 in the embodiment 3, in the proper area of RAM5. This fifth corresponding table 55 shows the relation among the abbreviated number or the one-touch dial etc., the destination number corresponding to the abbreviated number or one-touch dial, the destination name corresponding to the destination number and the available communication network. This fifth corresponding table 55 can be deleted, updated and added by users' operation, as well as that of the third and the fourth corresponding tables 53 and 54 in the embodiment 3.

Moreover, the drawings and the explanation of the other structure components are omitted, as it is the same as that of the embodiment 3.

Next, the operation of the facsimile device FAX1a in the embodiment 4 of the present invention will be described.

In case of the embodiment 3, the extension number or the facsimile number is accepted as the destination number of the facsimile device FAX2 from users in the step S201, however the abbreviated number corresponding to the extension number or the facsimile number other than these numbers may be also accepted in the case of the embodiment 4. Moreover, in the case of the embodiment 3, "0" or "*" may be attached to the destination number as the beginning number, however the beginning number like that is not attached in case of the embodiment 4.

Moreover, in case of the embodiment 3, which network is used among the internal network K, the public switched telephone network PSTN or the Internet NTW, is judged by discriminating the beginning number in the step S204, however the judgment of using which network is done by confirming the communication network made to correspond to the above received abbreviated number or the one-touch dial with reference to the fifth corresponding table 55 stored in RAM 5a in case of the embodiment 4. Additionally, the drawings and the explanation of the other process are omitted, as it is the same as that in the embodiment 3.

Image data can be transmitted using the proper communication network automatically by only selecting the abbreviated number, the extension number or the facsimile number as well as the ordinary case without users doing the special operation like this.

Moreover, in the above-mentioned third and fourth embodiments, communication through the computer communication network (Internet) between the facsimile device FAX1b and the gateway device GTW is implemented by either T.38 or SMTP protocol, however communication is not confined to these protocols and the other protocol can be available if the facsimile image data can be received and transmitted.

What is claimed is:

1. A facsimile device comprising:
a means for communicating via a public switched telephone network, with a communication device connected to said public switched telephone network, and with a gateway device connecting said public switched telephone network to a computer communication network; and,
a means for transmitting an image data to said communication device either directly through the public switched telephone network, or indirectly through the public switched telephone network, said gateway device, and the computer communication network, based on discrimination information.

2. A facsimile device comprising:
a means for communicating via a public switched telephone network, with a communication device connected to said public switched telephone network, and with a gateway device connecting said public switched telephone network to a computer communication network; and,
a means for memorizing corresponding information including discrimination information of a destination of image data and network information showing an available network; and,
a means for transmitting the image data to said communication device either directly through the public switched telephone network, or indirectly through the public switched telephone network, said gateway device, and the computer communication network, based on the corresponding information.

3. The facsimile device of claim 1, further comprising:
a means for judging whether the transmission of the image data using said computer network is completed or not; and,
a retransmitting means for transmitting the image data to said communication device in case of judging that said transmission is not completed.

4. The facsimile device of claim 2, further comprising:
a means for judging whether the transmission of the image data using said computer network is completed or not; and,
a retransmitting means for transmitting the image data to said communication device in case of judging that said transmission is not completed.

5. A facsimile device comprising:
a means for connecting respectively with a public switched telephone network and a computer communication network; and,
a means for transmitting an image data to a destination either directly through the public switched telephone network or indirectly through the computer communication network and the public switched telephone network based on discrimination information of the destination of the image data.

6. A facsimile device comprising:
a means for connecting respectively to a public switched telephone network and a computer communication network;
a means for memorizing discrimination information of a destination of an image data showing whether the public switched telephone network or the computer communication network is used; and,
a means for transmitting the image data to said destination either directly through the public switched telephone network or indirectly through the computer communication network and the public switched telephone network based on the discrimination information.

7. The facsimile device of claim 5, wherein a means for connecting with said public switched telephone network is composed such as to connect with the public switched telephone network via a private branch exchange connected to an internal network, characterized in that said network information shows which network is used among the internal network, the public switched telephone network or the computer communication network.

8. The facsimile device of claim 6, wherein a means for connecting with said public switched telephone network is composed such as to connect with the public switched telephone network via a private branch exchange connected to an internal network, characterized in that said network information shows which network is used among the internal network, the public switched telephone network or the computer communication network.

9. The facsimile device of claim 5, further including a means for transmitting the image data to said computer communication network by a real-time communication by T.38 protocol.

10. The facsimile device of claim 7, further including a means for transmitting the image data to said computer communication network by a real-time communication by T.38 protocol.

11. The facsimile device of claim 8, further including a means for transmitting the image data to said computer communication network by a real-time communication by T.38 protocol.

12. The facsimile device of claim 5, further including a means for transmitting the image data to said computer communication network by an email method communication by SMTP (Simple Mail Transfer Protocol).

13. The facsimile device of claim 7, further including a means for transmitting the image data to said computer communication network by an email method communication by SMTP (Simple Mail Transfer Protocol).

14. The facsimile device of claim 8, further including a means for transmitting the image data to said computer communication network by an email method communication by SMTP (Simple Mail Transfer Protocol).

15. A facsimile device comprising:
a communication unit for communicating via a public switched telephone network, with a communication device connected to said public switched telephone network, and with a gateway device connecting said public switched telephone network to a computer communication network; and
a transmitting unit for transmitting an image data to said communication device either directly through the public switched telephone network, or indirectly through the public switched telephone network, said gateway device, and the computer communication network, based on discrimination information.

16. The facsimile device of claim 15, further comprising:
a judging unit for judging whether the transmission of the image data using said computer network is completed or not; and,
a retransmitting unit for transmitting the image data to said communication device in case of judging that said transmission is not completed.

17. A facsimile device comprising:
a connecting unit for connecting respectively with a public switched telephone network and a computer communication network; and,
a transmitting unit for transmitting an image data to a destination either directly through the public switched telephone network or indirectly through the computer communication network and the public switched telephone network based on discrimination information of the destination of the image data.

18. The facsimile device of claim 17, wherein a connecting unit for connecting with said public switched telephone network is composed such as to connect with the public switched telephone network a private branch exchange connected to an internal network, characterized in that said network information shows which network is used among the internal network, the public switched telephone network or the computer communication network.

19. A method of operating a facsimile device, which has a communication unit for communicating via a public switched telephone network, with a communication device connected to said public switched telephone network, and with a gateway device connecting said public switched telephone network to a computer communication network, comprising:
transmitting an image data to said communication device either directly through the public switched telephone network, or indirectly through the public switched telephone network, said gateway device, and the computer communication network, based on discrimination information.

20. A method of operating a facsimile device, which has a connecting unit for connecting respectively with a public switched telephone network and a computer communication network, comprising;
transmitting an image data to a destination either directly through the public switched telephone network or indirectly through the computer communication network and the public switched telephone network based on discrimination information of the destination of the image data.

* * * * *